United States Patent
Andre

(10) Patent No.: US 7,287,809 B2
(45) Date of Patent: Oct. 30, 2007

(54) CROSS-MEMBER FOR A MOTOR VEHICLE FRONT END MODULE, AND A FRONT END MODULE AND A COOLING MODULE SUPPORT PROVIDED WITH SUCH A CROSS-MEMBER

(75) Inventor: Gerald Andre, Amberieu en Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 40 days.

(21) Appl. No.: 10/915,731

(22) Filed: Aug. 10, 2004

(65) Prior Publication Data

US 2005/0040672 A1 Feb. 24, 2005

(30) Foreign Application Priority Data

Aug. 11, 2003 (FR) ................................... 03 09836

(51) Int. Cl.
*B60R 19/18* (2006.01)
*B60R 19/52* (2006.01)

(52) U.S. Cl. .............................. 296/187.09; 296/187.04

(58) Field of Classification Search ........... 296/187.01, 296/187.03, 187.04, 187.09, 193.09, 203.01, 296/203.02

See application file for complete search history.

(56) References Cited

U.S. PATENT DOCUMENTS

| | | | | |
|---|---|---|---|---|
| 5,358,304 | A * | 10/1994 | Kanemitsu et al. | 296/193.09 |
| 5,658,041 | A * | 8/1997 | Girardot et al. | 296/193.09 |
| 5,988,305 | A * | 11/1999 | Sakai et al. | 296/187.04 |
| 6,138,429 | A * | 10/2000 | Baumgaertner | 52/735.1 |
| 6,216,810 | B1 * | 4/2001 | Nakai et al. | 180/68.4 |
| 6,237,990 | B1 * | 5/2001 | Barbier et al. | 296/187.09 |
| 6,273,496 | B1 * | 8/2001 | Guyomard et al. | 296/193.09 |
| 6,290,272 | B1 * | 9/2001 | Braun | 293/120 |
| 6,290,287 | B1 * | 9/2001 | Guyomard | 296/193.09 |
| 6,357,821 | B1 * | 3/2002 | Maj et al. | 296/193.09 |
| 6,412,855 | B1 * | 7/2002 | Cantineau et al. | 296/187.01 |
| 6,517,146 | B1 * | 2/2003 | Cheron et al. | 296/193.09 |
| 6,619,419 | B1 * | 9/2003 | Cheron et al. | 180/311 |
| 6,634,702 | B1 * | 10/2003 | Pleschke et al. | 296/187.04 |
| 6,679,545 | B1 * | 1/2004 | Balzer et al. | 296/193.09 |

(Continued)

FOREIGN PATENT DOCUMENTS

DE 100 42 037 A 3/2001

(Continued)

*Primary Examiner*—D. Glenn Dayoan
*Assistant Examiner*—Paul Chenevert
(74) *Attorney, Agent, or Firm*—James R. Williams

(57) ABSTRACT

The invention relates to a cross-member to be found in the proximity of a bodywork part capable of moving towards the cross-member, said cross-member being fitted with an inertia part and a stabilization part for geometrically stabilizing the inertia part. The stabilization part is longitudinally subdivided into a first portion located beside the bodywork part, and a second portion located remote from the bodywork part. The first and second portions are designed in such a manner that in the event of the bodywork part being subjected to a force equivalent to an impact against a pedestrian, said part can move towards second portion while deforming the inertia part and the first portion, without the second portion deforming. The invention also provides a front end module including such a cross-member.

21 Claims, 2 Drawing Sheets

U.S. PATENT DOCUMENTS

| | | |
|---|---|---|
| 6,698,808 B2 * | 3/2004 | Burkhardt et al. .......... 293/102 |
| 6,715,573 B2 * | 4/2004 | Emori et al. ............... 180/68.4 |
| 6,758,506 B2 * | 7/2004 | Malteste et al. ............ 293/102 |
| 6,767,052 B2 * | 7/2004 | Kubota .................. 296/203.02 |
| 6,908,132 B2 * | 6/2005 | Bauhof ...................... 296/1.01 |
| 6,997,490 B2 * | 2/2006 | Evans et al. ................ 293/120 |
| 7,144,054 B2 * | 12/2006 | Evans ........................ 293/120 |
| 2003/0052517 A1 * | 3/2003 | Nakata ....................... 296/194 |
| 2003/0141745 A1 * | 7/2003 | Henderson et al. .... 296/203.02 |
| 2003/0173802 A1 * | 9/2003 | Kubota .................. 296/203.02 |
| 2004/0084236 A1 * | 5/2004 | Okai et al. ................. 180/68.4 |
| 2005/0057076 A1 * | 3/2005 | Roux et al. ................. 296/198 |

FOREIGN PATENT DOCUMENTS

| | | | |
|---|---|---|---|
| DE | 101 43 532 A | 3/2003 | |
| EP | 1 067 039 A | 1/2001 | |
| EP | 1 291 247 A | 3/2003 | |
| EP | 1484235 A1 * | 12/2004 | ............ 296/187.09 |
| FR | 2 836 434 A | 8/2003 | |

* cited by examiner

CROSS-MEMBER FOR A MOTOR VEHICLE FRONT END MODULE, AND A FRONT END MODULE AND A COOLING MODULE SUPPORT PROVIDED WITH SUCH A CROSS-MEMBER

The present invention relates to a cross-member for a motor vehicle front end module, and to a front end module and a cooling module support provided with such a cross-member.

BACKGROUND OF THE INVENTION

In the state of the art, a cross-member is already known that is designed to be located close to a bodywork part that is liable to move toward the cross-member in the event of being subjected to a force equivalent to an impact with a pedestrian, said cross-member being provided with a part providing inertia and with a part providing geometrical stability.

Such a cross-member is placed beneath a hood, with connection elements serving to leave an empty space between the cross-member and the hood, so as to allow the hood to move into said empty space in the event of an impact against the hood.

In order to leave an empty space, it is necessary to reduce the height of the cross-member, thereby reducing its inertia.

In addition, obtaining such an empty space leads the front end module and the connection elements being more complicated to assemble, since the connection elements cannot be pre-mounted on the front end module so as to be brought to the vehicle together with the front end module.

In addition, because of the empty space, the connection elements are necessarily non-standard since they must include specific devices enabling them simultaneously to perform their own function and to release a determined stroke in the event of an impact against a pedestrian, in order specifically to limit the deceleration suffered by the pedestrian.

OBJECTS AND SUMMARY OF THE INVENTION

A particular object of the invention is to remedy those drawbacks by providing a cross-member having sufficient inertia and being suitable for enabling the hood to travel over a stroke during an impact against the hood, but without an empty space being provided for this purpose.

To this end, the invention provides a cross-member designed to be located in the proximity of a bodywork part capable of moving towards the cross-member, said cross-member being provided with an inertia part and with a stabilization part for geometrically stabilizing the inertia part, wherein the stabilization part is longitudinally subdivided into a first portion located beside the bodywork part, and a second portion located remote from the bodywork part, the first and second portions being designed in such a manner that in the event of the bodywork part being subjected to a force equivalent to an impact against a pedestrian, said part can move towards second portion while deforming the inertia part and the first portion, without the second portion deforming.

Thus, a cross-member of the invention can allow a travel stroke for the hood in the event of an impact against the hood, and can do so without reducing the inertia of the cross-member.

According to advantageous other characteristics of the invention, which can be taken singly or in combination:

the inertia part occupies the full height of the stabilization part;

the inertia part is provided with a C-shaped section or with a S-shaped section;

the inertia part is provided with openings in register with the first portion;

the first portion is provided with ribs arranged to buckle in response to impacts that are directed downwardly when the cross-member is mounted on the vehicle;

the first portion is provided with ribs arranged to buckle in response to impacts that are directed rearwardly when the cross-member is mounted on the vehicle;

the ribs do not present any lateral cohesion with the inertia part, so as to enable them to buckle in the event of an impact;

the second portion is provided with stiffening ribs;

the inertia part is a metal section member;

the inertia part is made of plastics material;

the stiffening ribs are made of plastics material;

the cross member includes connection means for connecting the cross-member to the bodywork part;

the connection means comprise abutments against which the bodywork part can come to bear;

the connection means comprise a hook suitable for holding the bodywork part close to the cross-member;

the hook is fastened to the inertia part in register with its second portion;

the connection means comprise a lock for catching the bodywork part, and arranged on the first portion of the inertia part;

the cross member includes, in its top portion, a connection area for receiving a bumper or a grille, said connection area being suitable for transmitting forces equivalent to an impact against a hip;

the cross member includes, in its top portion, a hood gasket;

an element requiring a high degree of stiffness, for example a sensor, is arranged on the bottom portion of the cross-member;

the hook is longer than a standard hook; and the cross member is designed to be arranged on a motor vehicle front end module.

The invention also provides a motor vehicle front end module including a cross-member as described above.

Finally, the invention provides a cooling module support for a motor vehicle, including such a cross-member.

BRIEF DESCRIPTION OF THE DRAWINGS

The invention will be better understood on reading the following description given purely by way of example and made with reference to the accompanying drawings, in which.

MORE DETAILED DESCRIPTION

Figure 1:
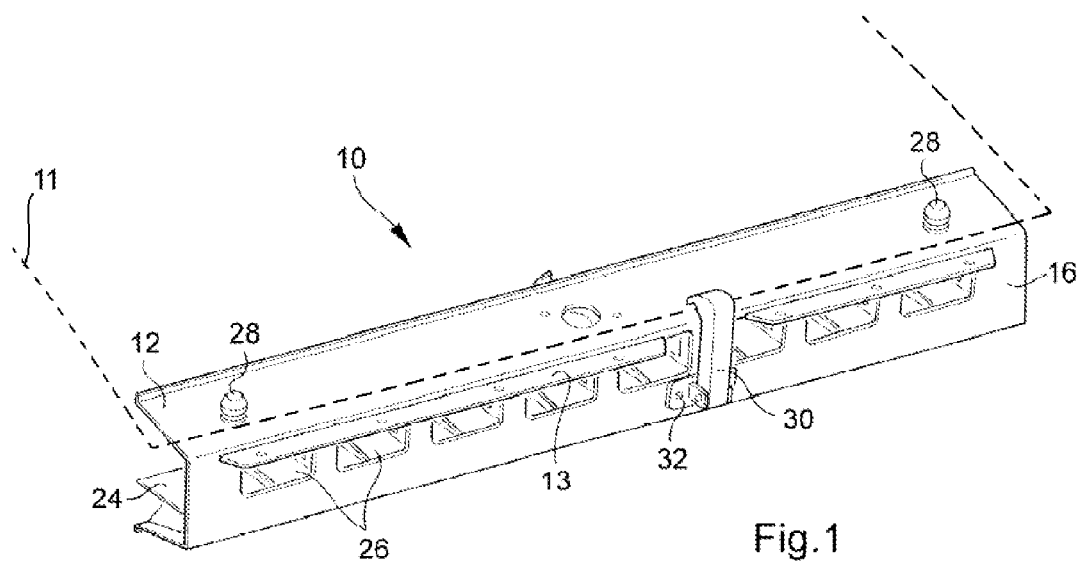
FIG. 1 is a perspective view of a cross-member constituting an embodiment of the invention, as seen from the outside.
Figure 2:
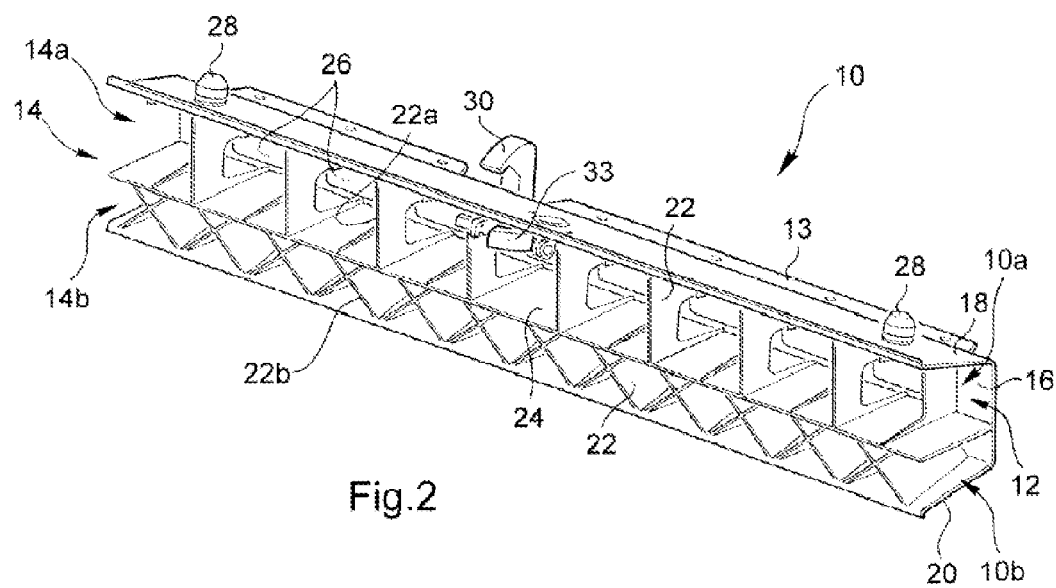
FIG. 2 is a view analogous to FIG. 1 showing the cross-member as seen from the inside.

The cross-member shown in FIGS. 1 and 2 is designated by overall reference 10. It is designed to be located close to a bodywork part 11 that is liable to move towards the cross-member. By way of example, the bodywork part 11 may be a front hood of a motor vehicle.

The cross-member is provided with an inertia part 12 and a stabilization part 14 providing geometrical stability to said inertia part 12.

More precisely, the inertia part 12 comprises a wall 16 that is vertical (in the orientation of the drawing) and two flanges 18 and 20 that are substantially horizontal (in the orientation of the drawing) extending perpendicularly to the vertical wall 16, in the longitudinal direction of the cross-member 10. The inertia part 12 is thus provided with a C-shaped section, however in another embodiment that is not shown, its section could be S-shaped.

In its top portion, the inertia part includes a connection area 13 for receiving a bumper or a grille. This connection area 13 is liable to transmit forces equivalent to an impact against the hip of a pedestrian.

In its top portion, the inertia part optionally also includes a hood sealing gasket (not shown).

In order to provide good inertia, the inertia part 12 occupies all of the space normally available for a cross-member. To do this, the inertia part 12 occupies the full height of the stabilization part 14.

In general, the inertia part 12 is a metal section member, however, it is possible to envisage making the inertia part 12 out of plastics material, or indeed out of composite material.

The stabilization part 14 is subdivided longitudinally into a first portion 14a located beside the bodywork part 11, and a second portion 14b located remote from the bodywork part 11.

These two portions 14a and 14b define first and second portions 10a and 10b of the cross-member 10.

The portions 14a and 14b are designed in such a manner that in the event of the hood being subjected to a force equivalent to an impact against a pedestrian, then the hood is capable, without the second portion 14b deforming, of moving towards said second portion 14b while deforming the inertia part 12 and the first portion 14a. Nevertheless, the inertia part 12 and the first portion 14a are dimensioned so as to be capable of deforming in their elastic range only, providing the force applied to the hood is below a certain threshold, for example the force that arises when the hood is slammed shut.

The first portion 14a and the first portion 10a of the cross-member are capable of deforming without putting up strong resistance to the force equivalent to a held close to the cross-member 10 by means of a hook 30 which is fastened to the second portion 10b of the inertia part 12 by fasteners 32. It is necessary for the hook to be fixed to the rigid portion of the cross-member so that the cross-member can satisfy structural specifications that require, amongst other things, that the hook 30 can withstand hood pulling test. The hook 30 as fastened in this way to the bottom portion of the inertia part is necessarily longer than a standard hook.

The connection means further include a lock 33 for catching the bodywork part 11.

Figure 3:
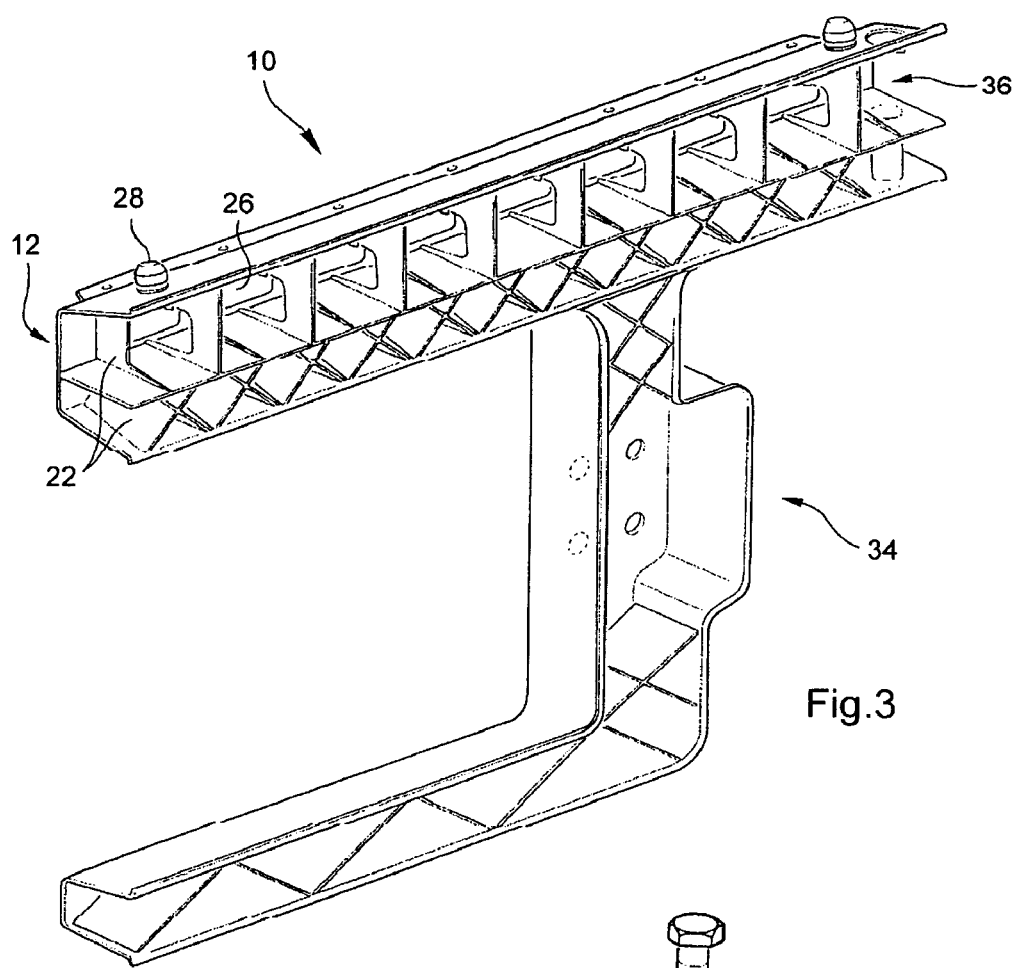
FIG. 3 is a view of the inside of a front end module fitted with such a cross-member.
Figure 4:
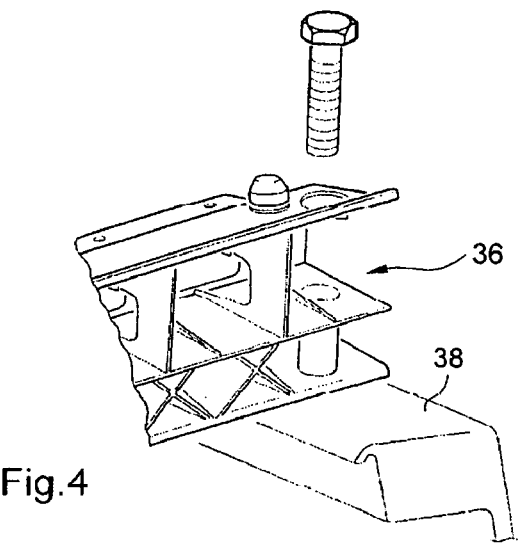
FIG. 4 is a detail of FIG. 3 showing means for bolting the cross-member to a fender backing member.

In the embodiment described, the cross-member 10 is designed to be arranged on a front end module 34, as can be seen in FIG. 3.

The cross-member 10 also includes means 36 for bolting the second portion 14b onto a motor vehicle fender backing member 38.

Naturally, the embodiment described above is not limiting in any way and can be modified in any desirable manner without thereby going beyond the ambit of the invention. pedestrian impact, whereas the second portion 14b, and the second portion 10b of the cross-member, are of rigid structure so as to protect the structure in the event of a large force, e.g. in an accident situation.

This difference in behavior between the top and bottom portions 10a and 10b of the cross-member 10 is due in particular to ribs 22 as described below.

The ribs 22 are general made of plastics material and they are subdivided into two groups, 22a and 22b, a top group 22a and a bottom group 22b.

The ribs 22a of the top group extend vertically (in the orientation of the drawing), i.e. perpendicularly to the flanges 18 and 20, and perpendicularly to the vertical wall 16 of the inertia part 12.

The top 10a and bottom 10b portions of the cross-member are separated by a plane 24 integrally molded with the ribs 22 and disposed substantially parallel to the flange 18 of the inertia part 12.

This plane 24 supports the ribs 22a of the top group via its top face, and the ribs 22b of the bottom group via its bottom face.

The ribs 22 are made by being overmolded onto the inertia part 12 and they adhere to the inside face of said inertia part 12. Nevertheless, by way of exception, the ribs 22a of the top group do not join the vertical wall 16, and consequently they are connected to the inertia part 12 only via their top edges which adhere to the inside face of the top flange 18.

As a result, the ribs 22a of the top group present very little inertia in the vertical direction, so vertical compression applied to the support leads to its top portion being flattened, with the ribs 22a buckling easily without being retained by the vertical wall 16 of the inertia part 12.

In other words, the ribs 22a of the top group do not oppose resistance to deformation of the top portion 10a of the cross-member in the event of an impact against the head of a pedestrian.

These ribs 22a as organized in this way can even buckle in the event of rearwardly-directed impacts, e.g. in the event of an impact against a hip in a rearwardly-sloping direction.

It should also be observed that the inertia part 12 is provided with openings in register with the first portion 14a of the stabilization part. These openings 26 serve to reduce stiffness of the inertia part 12 along a vertical axis in this top portion 10a so as to make it easier to deform in the event of vertical compression.

The ribs 22b of the bottom group are arranged in a honeycomb, sloping relative to the bottom edge 20 of the inertia part 12 and to the separation plane 24, and crossing one another. Their edges are secured to the bottom portion lob of the inertia part 12, i.e. the bottom flange 20 and the bottom portion of the vertical wall 16, and also to the separation plane 24 between the two groups of ribs.

In another embodiment (not shown), the ribs 22b can be arranged in a V-shaped configuration.

Arranged and held in an array in this way, the ribs 22b of the bottom group constitute a structure that is suitable for withstanding the forces given in traditional specifications for front end modules.

In addition, the bottom portion of the inertia part 12, having no openings, is more rigid than the top portion of the inertia part 12 and does not deform during compression.

The bottom portion is thus suitable for receiving elements that require good stiffness, and in particular for receiving various sensors.

Furthermore, the cross-member 10 includes means for connection with the hood. Abutments 28 against which the hood can come to bear are arranged on the top flange 18 of the inertia part 12. The hood is suitable for being held close to the cross-member 10 by means of a hook 30 which is fastened to the second portion 10*b* of the inertia part 12 by fasteners 32. It is necessary for the hook to be fixed to the regid portion of the cross-member so that the cross-member can satisfy structural specifications that require, amongst other things, that the hook 30 can withstand hood pulling test. The hook 30 as fastened in this way to the bottom portion of the inertia part is necessarily longer than a standard hook.

The connection means further include a lock 33 for catching the bodywork part.

In the embodiment described, the cross-membered 10 is designed to be arranged on a front end module 34, as can be seen in FIG. 3.

The cross-member 10 also includes means 36 for bolting the second portion 14*b* onto a motor vehicle fender backing member 38.

Naturally, the embodiment described above is not limiting in any way and can be modified in any desirable manner without thereby going beyond the ambit of the invention.

What is claimed is:

1. A cross-member for a vehicle designed to be located in the proximity of a hood bodywork part capable of moving towards the cross-member, the cross-member comprising an inertia part and a stabilization part for geometrically stabilizing the inertia part, wherein:
   a) the stabilization part is longitudinally subdivided into a first portion located beside the hood bodywork part, and a second portion located remote from the hood bodywork part, the first and second portions being designed in such a manner that in the event of the hood bodywork part being subjected to a force equivalent to an impact against a pedestrian, the hood bodywork part can move towards the second portion while deforming the inertia part and the first portion, without the second portion deforming, and
   b) the first portion includes ribs arranged to buckle in response to impacts that are directed rearwardly when the cross-member is mounted on a vehicle.

2. A cross-member according to claim 1, wherein the inertia part occupies the full height of the stabilization part.

3. A cross-member according to claim 1, wherein the second portion includes stiffening ribs.

4. A cross-member according to claim 1, wherein the inertia part consists essentially of a metal section member.

5. A cross-member according to claim 1, wherein the inertia part consists essentially of a plastic.

6. A cross-member according to claim 1, wherein the cross-member includes a top portion having a connection area for receiving a hood bodywork part, the connection area being suitable for transmitting forces equivalent to an impact against a hip.

7. A cross-member according to claim 1, wherein the cross-member includes a top portion having a hood gasket.

8. A cross-member according to claim 1, wherein the inertia part includes a bottom portion, and an element requiring a high degree of stiffness is arranged on the bottom portion of the cross-member.

9. A cross-member according to claim 1, designed to be arranged on a motor vehicle front end module.

10. A cross-member according to claim 1, wherein the ribs are also arranged to buckle in response to impacts that are directed downwardly when the cross-member is mounted on a vehicle.

11. A cross-member according to claim 1, wherein the ribs consist essentially of plastic.

12. A cross-member according to claim 1, wherein the inertia part comprises a C-shaped section.

13. A cross-member according to claim 12, wherein the inertia part is provided with openings in register with the first portion.

14. A cross-member according to claim 12, wherein the ribs do not present any lateral cohesion with the inertia part, so as to enable the ribs to buckle in the event of an impact.

15. A cross-member according to claim 1 wherein the cross-member includes a connector able to connect the cross-member to the hood bodywork part of the vehicle.

16. A cross-member according to claim 15, wherein the connector comprises abutments against which the hood bodywork part can come to bear.

17. A cross-member according to claim 15, wherein the connector comprises a lock for catching the hood bodywork part, and arranged on the first portion.

18. A cross-member according to claim 15, wherein the connector comprises a hook suitable for holding the hood bodywork part close to the cross-member.

19. A cross-member according to claim 18, wherein the hook is fastened to the inertia part in register with the second portion.

20. A motor vehicle front end module, including a cross-member located in the proximity of a hood bodywork part capable of moving towards the cross-member, the cross-member being provided with an inertia part and with a stabilization part for geometrically stabilizing the inertia part, wherein the stabilization part is longitudinally subdivided into a first portion located beside the hood bodywork part, and a second portion located remote from the hood bodywork part, the first and second portions being designed in such a manner that in the event of the hood bodywork part being subjected to a force equivalent to an impact against a pedestrian, the hood bodywork part can move towards the second portion while deforming the inertia part and the first portion, without the second portion deforming and the first portion includes ribs that are arranged to buckle in response to impacts that are directly rearwardly when the cross-member is mounted on a vehicle.

21. A motor vehicle cooling module support, including a cross-member located in the proximity of a hood bodywork part capable of moving towards the cross-member, the cross-member being provided with an inertia part and with a stabilization part for geometrically stabilizing the inertia part, wherein the stabilization part is longitudinally subdivided into a first portion located beside the hood bodywork part, and a second portion located remote from the bodywork part, the first and second portions being designed in such a manner that in the event of the hood bodywork part being subjected to a force equivalent to an impact against a pedestrian, the hood bodywork part can move towards the second portion while deforming the inertia part and the first portion, without the second portion deforming and the first portion includes ribs that are arranged to buckle in response to impacts that are directly rearwardly when the cross-member is mounted on a vehicle.

* * * * *